July 17, 1934.  H. P. DEAN  1,966,851
LID FOR PRESSURE RESISTING VESSELS
Filed Nov. 7, 1933  3 Sheets-Sheet 1
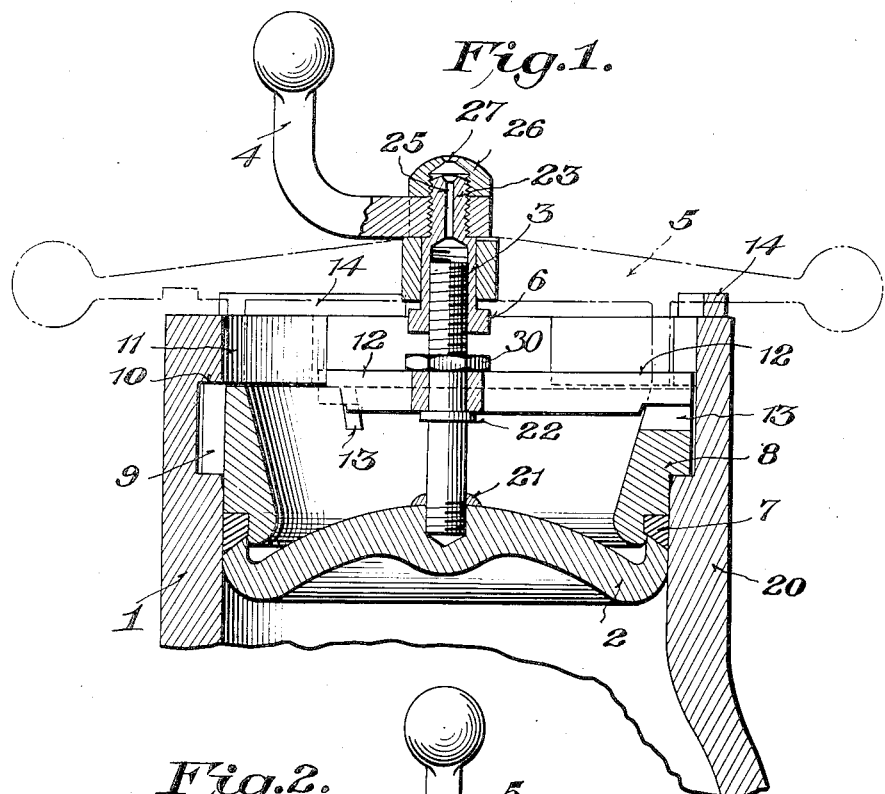
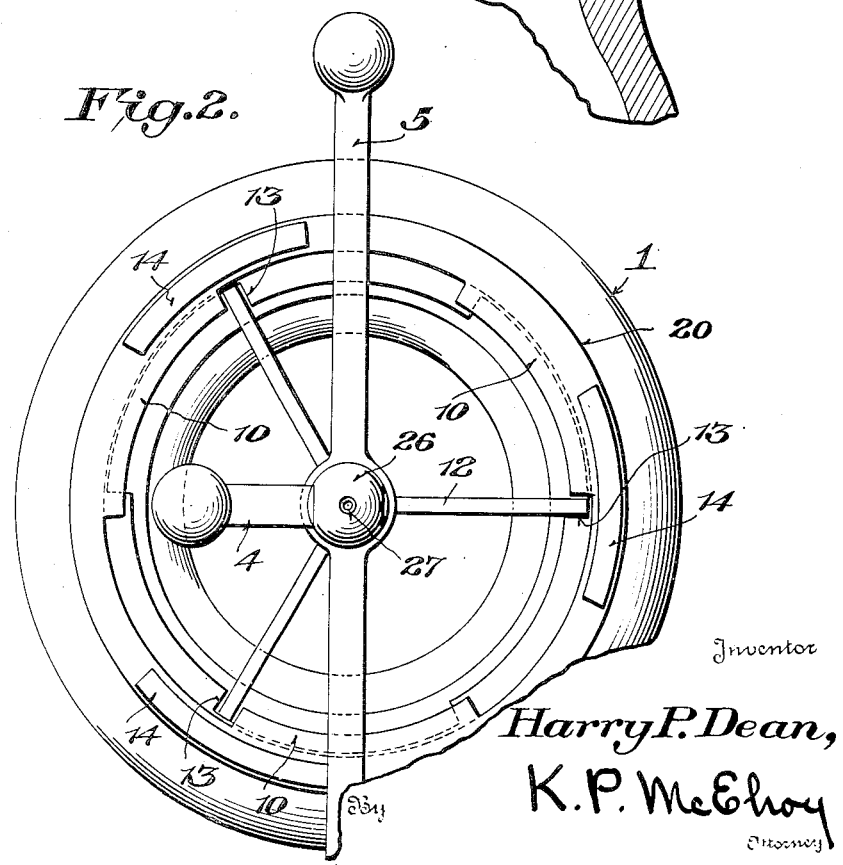
Inventor
Harry P. Dean,
K. P. McElroy
Attorney

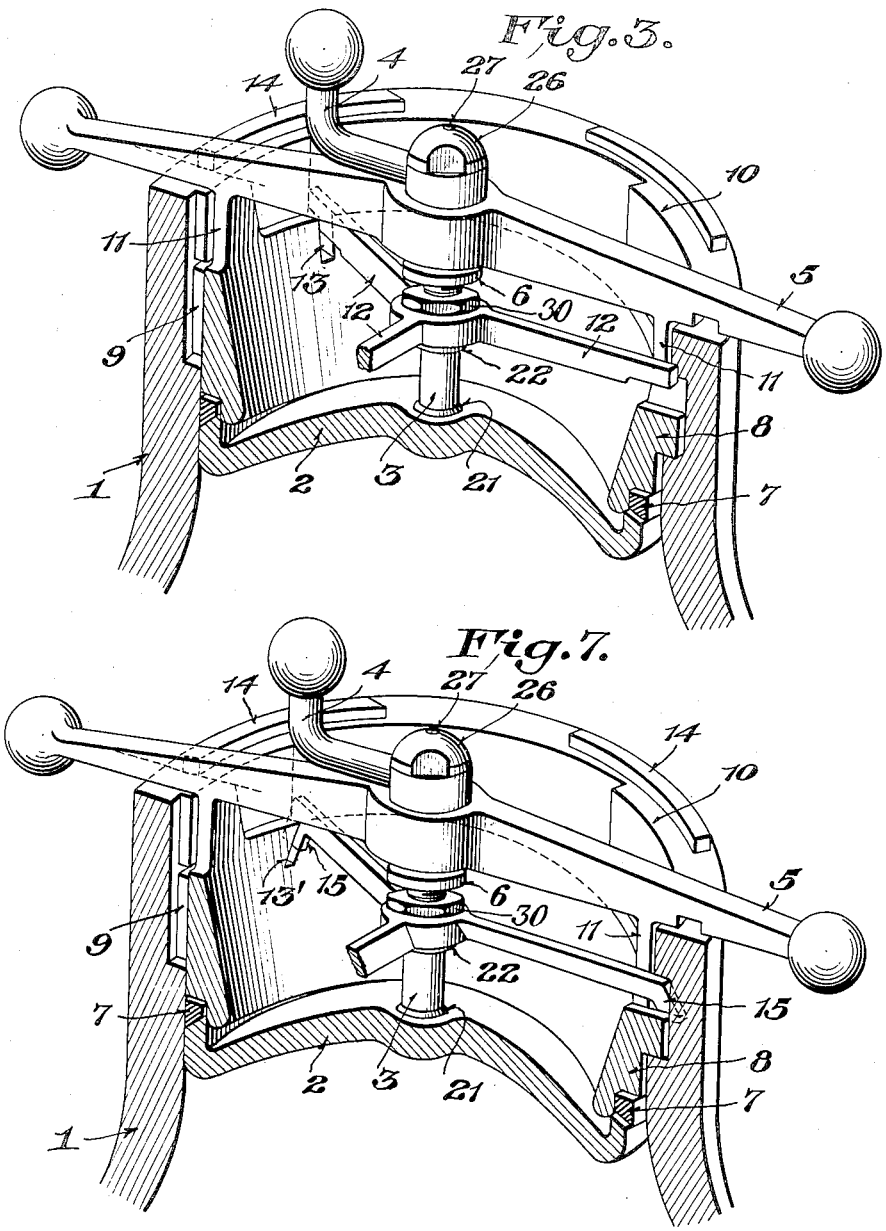

July 17, 1934.  H. P. DEAN  1,966,851
LID FOR PRESSURE RESISTING VESSELS
Filed Nov. 7, 1933   3 Sheets-Sheet 3
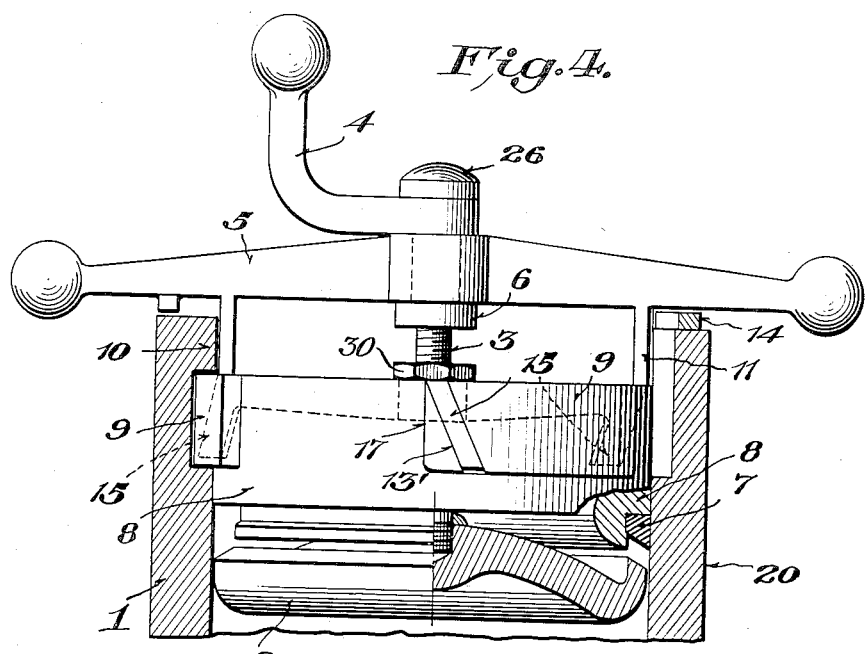
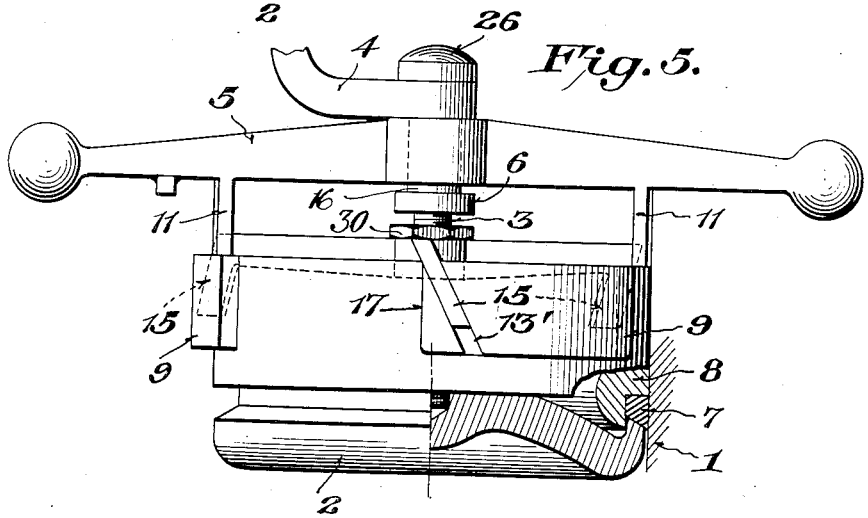
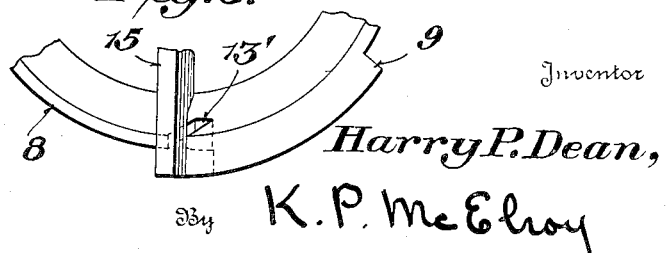
Inventor
Harry P. Dean,
By K. P. McElroy
Attorney Patented July 17, 1934

1,966,851

UNITED STATES PATENT OFFICE 1,966,851

LID FOR PRESSURE RESISTING VESSELS

Harry Pitt Dean, Norton-on-Tees, England, assignor to Imperial Chemical Industries Limited, a corporation of Great Britain Application November 7, 1933, Serial No. 697,039
In Great Britain November 4, 1932

5 Claims. (Cl. 220—57)

This invention relates to lids for pressure-resisting vessels in which fluids are stored or generated under pressure, and in particular to lids for pressure-resisting vessels of a type suitable for the liquefaction or gasification of solid carbon dioxide.

In Patent No. 1,932,135 there is disclosed a sealing device for pressure-holding vessels, which comprises a lid adapted to fit in the mouth of the vessel, and a soft gasket arranged in contact with the outer rim of the lid, with the wall of the pressure-resisting vessel and with a following ring of metal. This latter is adapted to be locked in position in the mouth of the pressure-resisting vessel by partial rotation so that segmental projections on the outer circumferential surface of the ring bear against corresponding projections in the mouth of the vessel, thus preventing outward movement of the ring. The rim of the lid is then brought tightly to bear on the gasket by means of a stud which is secured to the centre of the lid, the said stud carrying at its outer end a nut or handle which can be screwed down on an intermediate cross-piece or other supporting member which is incapable of substantial inward movement.

In sealing devices of the kind described, if the following ring is rotated to the unlocked position while there is any considerable pressure existing in the vessel there is a risk that, instead of the sealing joint being broken to allow of escape of gas, the entire sealing device, comprising lid, gasket and following ring, may be ejected forcibly from the mouth of the vessel. Furthermore, in the operation of making the sealing joint after the vessel has, for example, been charged with solid carbon dioxide, any rapid gas evolution may cause the lid to rise into sealing engagement with the gasket before the following ring has been locked into position and some difficulty may be experienced in inserting the sealing device into the correct locking position.

The object of the present invention is to provide improvements in pressure-resisting lids of the kind described which improvements facilitate rapid and safe assemblage of the lid and ensure that the pressure is released before the device is removed from the vessel therein.

According to the invention, in a sealing device of the kind described, means are provided for raising and lowering the lid in relation to the mouth of the vessel and the following ring, and also means are provided for simultaneously preventing rotation of the following ring except when the lid is lowered and is out of sealing contact with the following ring and gasket. Preferably the following ring is fixed to the cross-piece which bears on the top of the vessel and the nut or handle is provided with a thrust collar on the underside of the cross-piece so that by rotating the handle in the appropriate direction the lid may be moved either upwardly or downwardly. A certain amount of idle movement on the thrust collar allows the final movement of the lid to be free so that the gasket may be further compressed by the pressure in the vessel. Furthermore, it is preferred to provide a locking arm in fixed spacial relationship to the lid and adapted to engage with projections in the mouth of the vessel and in the following ring in such a way that the following ring is incapable of rotation except when the locking arm and lid have been lowered and the lid is out of sealing contact with the following ring and gasket.

In the accompanying drawings I have shown, more or less diagrammatically, apparatus within the invention. In these showings, Fig. 1 is a view partly in elevation, partly in vertical section, of one form of sealing device applied to a pressure vessel;

Fig. 2 is a plan view corresponding to Fig. 1;

Fig. 3 is an isometric sectional view corresponding to Fig. 1;

Fig. 4 is a view partly in elevation, partly in vertical section, of a modified form of sealing device;

Fig. 5 is a view of the sealing device of Fig. 4, the parts being shown in different relative position;

Fig. 6 is a fragmentary plan view of part of the device of Fig. 4; and

Fig. 7 is an isometric view corresponding to Fig. 4.

In the showings, in which like reference characters indicate like parts. Figs. 1 to 3 show one form of the invention applied to a pressure vessel 1 swaged at the upper end as at 20 in order to carry the sealing device. The sealing device comprises a discoid lid 2 firmly attached to a stud 3 at 21 as by threads and welding, as shown. The stud is provided with a collar 22, as shown. The upper portion of the stud is threaded, as shown, and carries a threaded sleeve 23, the lower end of which is provided with a collar 6. The sleeve is provided with a lubrication port 25, as shown, for supplying lubricant to the threaded stud. A nut 26, provided with a lubrication orifice 27 corresponding to port 25 in the sleeve, serves to lock the handle 4 in place. Collar 6 serves to prevent vertical motion of the handle relative to a rigid cross-piece 5, and the lid 2 may thus be raised or lowered by rotation of the handle in the appropriate direction. Downward movement of the collar is prevented by the handle itself bearing on the cross-piece 5. The rim of the lid when in a closed position presses against the elastic gasket 7 which is located on the underside of the following ring 8. The following ring is secured in the mouth of the vessel by being rotated so as to bring the projections 9 under the corresponding projections 10 in the mouth of the vessel. The following ring is rigidly connected to the cross-piece 5 by means of the connecting pieces 11 (shown best in Fig. 3).

A locking piece in the form of a spider having three arms 12 is secured to the stud 3 by means of the collar 22 and a nut 30 so that the locking piece is in fixed vertical relationship to the lid 2 and is incapable of radial movement with respect to the stud 3. The following ring 8 can be rotated so as to allow assembly or removal of the lid, only when the locking arms 12 are lowered into the recesses 13 in the following ring. When in this position the lid is clear of the gasket 7 and therefore the device can only be removed from or inserted in the mouth of the vessel when a free passage is provided for gas to escape from the inside of the vessel. When the handle is turned so as to bring the lid upward against the gasket, thereby sealing the vessel, the three locking arms also move vertically upward and outward from the recesses 13 so that one of the vertical faces of each arm bears against one of the vertical faces of the projections 10. In Figure 3, two of the locking arms are shown in this position so that rotation of the following ring in a counter-clockwise direction, looking in plan, is prevented. Clockwise rotation is also prevented by means of the retaining projections 14 on the top of the vessel which bear against the cross-piece 5.

In assembling the device shown in Figs. 1 to 3 the lid 2 is lowered from the following ring 8 by rotating the handle 4 in the appropriate direction so that a space is left between the lid and the gasket 7 sufficient to allow a passage for the gas to escape from the vessel during the whole of the time required to assemble the complete cover in position. The following ring 8 is then rotated into position so that the projections 9 coincide with the projections 10 in the mouth of the vessel. The handle 4 is then rotated and the lid is brought into contact with the gasket. A certain amount of idle movement on the thrust collar 6 of the sleeve allows the final movement to be free so that the gasket may be compressed further by the pressure inside of the vessel. At the same time as the lid is raised, the locking arms 12 slide up the recesses 13 and bear against the projections in the mouth of the cylinder. Rotation of the following ring with a view to freeing the cover is thereby prevented and the cover can only be removed by lowering the lid and locking arms by means of the handle. This is only possible when the pressure in the vessel is very low and even this pressure is released when the lid is lowered and before the locking arms are fully lowered into the recesses.

In Figs. 4 to 7 I have shown a modified form of sealing device. Referring to Figs. 4 to 7, the device comprises a locking ring 8, a cross piece 5, and a lid, stud and cross-piece assembly as in the device of Figs. 1 to 3. The locking piece or spider in this modification is provided with three arms 15, inclined as shown. The ends of the inclined arms are adapted to slide in similarly inclined recesses 13' in the locking ring. The spider is mounted on stud 3 by means of nut 30 and collar 22 and is free to rotate on the stud while remaining in fixed vertical relationship with the lid 2. The arrangement is such that it is impossible to place the sealing device into the mouth of the vessel if the lid 2 is drawn tightly against gasket 7, that is, preventing release of any pressure which is being generated in the vessel at the time when it is being sealed.

The correct position, as regards relative position of the parts, in which the sealing device should be placed into the vessel is shown in Figure 4 in which it will be seen that there is a passage past the lid 2 and the gasket 7, whilst it will also be noticed that the inclined arm 15 is completely accommodated in the recess 13'. If the handle 4 is rotated in the appropriate direction after the sealing device is placed in the correct position in the mouth of the vessel, as previously described, the cross piece 5 bears against the top of the vessel, the lid 2 is drawn against the gasket 7 and the inclined arm 15 moves some distance out of the recess 13'. A small clearance between the collar and the cross-piece 5 as shown at 16 allows pressure inside the vessel to assist sealing by forcing the lid further against the gasket. The construction is now locked in position and cannot be removed until the lid 2 is again forced away from the gasket 7.

In the closed position, as shown in Fig. 5, the top edge of the inclined arm 15 projects over the edge 17 of the projection 9 on the following ring 8, and since the distance between the projections in the mouth of the vessel is just sufficient to allow the projections on the following ring to slide into position, the overlapping portion of the inclined arm prevents the placing of the device in the closed position into the mouth of the vessel.

I claim:—

1. A sealing device for a pressure vessel having a cylindrical mouth, said sealing device comprising a lid, a removable following ring provided with locking means, the mouth of the vessel being provided with corresponding locking means, the following ring being adapted to be locked in the mouth of the vessel, a gasket between the lid and the locking ring and adapted to form a seal with the mouth of the vessel, a vertical stud attached to the lid, a removable cross-piece adapted to engage the upper portion of the mouth of the vessel, screw means engaging the stud and the cross-piece and adapted upon being actuated to draw the lid closer to the cross-piece and to compress the gasket between the lid and the following ring and means adapted to prevent removal of the following ring from the mouth of the vessel when the lid is drawn against the gasket forming a seal and to allow removal of the following ring from the vessel when the lid is away from the gasket.

2. A device as set forth in claim 1 wherein the means for preventing removal of the following ring comprise a locking arm mounted in fixed vertical relationship with the lid, the following ring being provided with a slot adapted to receive one end of the arm, said arm being adapted to slide vertically in the slot upon raising or lowering the lid, said arm being adapted when the lid is drawn against the gasket to engage the locking means in the mouth of the vessel and prevent removal of the locking ring and adapted when the lid is away from the gasket to be brought out of engagement with the locking means and thus to prevent removal of the locking ring.

3. The sealing device of claim 1 wherein the locking means on the locking ring and in the mouth of the vessel are of a type adapted to allow the following ring to be rotated into locked position and rotated out of locked position for removal and the means for preventing removal of the following ring comprise means adapted to engage the locking means in the mouth of the vessel and to prevent rotation of the following ring in one direction and further comprise retaining means on the upper portion of the vessel adapted to prevent rotation of the cross-piece in the other direction.

4. A sealing device as set forth in claim 1 in which the screw means engaging the stud comprises a sleeve rotatably mounted in the cross-piece and extending through and below the cross-piece, the lower portion of the sleeve below the cross-piece being provided with a collar in such position that when the lid is drawn tight against the gasket a small amount of free play is left between the collar and the cross-piece so that pressure developed in the pressure vessel is allowed to force the lid freely against the gasket.

5. A sealing device as set forth in claim 1 wherein the means for preventing rotation of the following ring comprise a locking arm mounted on the stud in fixed relationship with respect to the lid and adapted to rotate with respect to the lid, the end of the arm being inclined with respect to the vertical, the locking ring being provided with a similarly inclined slot adapted to receive the end of the arm, the end of the arm being adapted to slide into the slot and upward and outward from the slot upon lowering and raising the lid, the end of the arm when slid upward and outward from the slot being adapted to engage the locking means in the mouth of the vessel so that the locking ring can only be removed when the arm is sunk in the slot and also the sealing device can only be inserted in the mouth of the vessel when the arm is in this position.

HARRY PITT DEAN.